United States Patent
Han et al.

(10) Patent No.: US 8,614,860 B2
(45) Date of Patent: Dec. 24, 2013

(54) PMR HEAD WITH INTEGRATED SIDE SHIELD (ISS)

(75) Inventors: Cherng-Chyi Han, San Jose, CA (US); Lijie Guan, San Jose, CA (US); Joe Smyth, Aptos, CA (US); Moris Dovek, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 13/373,172

(22) Filed: Nov. 7, 2011

(65) Prior Publication Data

US 2012/0069470 A1 Mar. 22, 2012

Related U.S. Application Data

(62) Division of application No. 12/072,272, filed on Feb. 25, 2008, now Pat. No. 8,056,213.

(51) Int. Cl.
*G11B 5/127* (2006.01)

(52) U.S. Cl.
USPC .................................................. 360/125.03

(58) Field of Classification Search
USPC ............. 360/125.03, 125.12, 123.05, 125.15, 360/125.06, 125.3, 125.17, 125.13, 125.31, 360/125.02
See application file for complete search history.

(56) References Cited

U.S. PATENT DOCUMENTS

| | | | |
|---|---|---|---|
| 7,002,775 B2 | 2/2006 | Hsu et al. | |
| 7,068,453 B2 | 6/2006 | Terris et al. | |
| 7,070,698 B2 | 7/2006 | Le | |
| 7,154,706 B2* | 12/2006 | Sasaki et al. | 360/125.33 |
| 7,155,809 B2* | 1/2007 | Sasaki et al. | 29/603.12 |
| 7,253,991 B2 | 8/2007 | Fontana, Jr. et al. | |
| 7,293,344 B2* | 11/2007 | Han et al. | 29/603.13 |
| 7,367,112 B2 | 5/2008 | Nix et al. | |
| 7,593,185 B2* | 9/2009 | Yazawa | 360/125.28 |
| 7,649,712 B2 | 1/2010 | Le et al. | |
| 7,715,152 B2* | 5/2010 | Okada et al. | 360/319 |
| 7,804,666 B2* | 9/2010 | Guan et al. | 360/319 |
| 7,898,773 B2 | 3/2011 | Han et al. | |
| 7,920,359 B2* | 4/2011 | Maruyama et al. | 360/125.3 |
| 7,990,653 B2* | 8/2011 | Mochizuki et al. | 360/125.09 |
| 8,035,930 B2 | 10/2011 | Takano et al. | |
| 8,117,738 B2* | 2/2012 | Han et al. | 29/603.16 |
| 8,164,853 B2* | 4/2012 | Hirata et al. | 360/125.3 |
| 8,238,056 B2* | 8/2012 | Guan et al. | 360/119.02 |
| 8,379,347 B2* | 2/2013 | Guan et al. | 360/125.15 |
| 2004/0061979 A1* | 4/2004 | Ho et al. | 360/321 |
| 2007/0164264 A1* | 7/2007 | Lenssen et al. | 257/1 |
| 2007/0253107 A1* | 11/2007 | Mochizuki et al. | 360/126 |
| 2008/0112081 A1* | 5/2008 | Matono | 360/125.08 |
| 2009/0116145 A1* | 5/2009 | Guan et al. | 360/125.02 |
| 2009/0168241 A1* | 7/2009 | Mochizuki et al. | 360/125.03 |
| 2011/0102936 A1* | 5/2011 | Sugiyama et al. | 360/75 |
| 2012/0044598 A1* | 2/2012 | Bai et al. | 360/123.12 |
| 2012/0281313 A1* | 11/2012 | Guan et al. | 360/122 |

* cited by examiner

*Primary Examiner* — Allen T Cao
(74) *Attorney, Agent, or Firm* — Saile Ackerman LLC; Stephen B. Ackerman

(57) ABSTRACT

A PMR head comprises a substrate, a magnetic pole formed over the substrate, the pole having a pole tip having a cross-sectional tapered shape wherein the pole tip is surrounded by a write gap layer, an integrated shield comprising side shields on the substrate laterally surrounding the pole tip and a trailing shield overlying the pole tip and integral with the side shields.

6 Claims, 11 Drawing Sheets

PMR HEAD WITH INTEGRATED SIDE SHIELD (ISS)

This is a divisional application of U.S. Ser. No. 12/072,272 filed on Feb. 25, 2008 now U.S. Pat. No. 8,056,213.

RELATED PATENT APPLICATION

U.S. patent application Ser. No. 11/906,717 filed on Oct. 3, 2007 and assigned to the same assignee of the present invention, and herein incorporated by reference in its entirety.

BACKGROUND OF THE INVENTION (1) Field of the Invention

This invention is related to magnetic recording heads and, more particularly, to shielding of perpendicular magnetic recording heads.

(2) Description of the Related Art

In order to push for high track density perpendicular magnetic recording (PMR), it is necessary to have side shield PMR design to reduce fringe and to improve side erasure. There are several proposals to use subtractive methods such as reactive ion etching (RIE) or ion beam etching (IBE) to etch into the magnetic shield followed by atomic layer deposition (ALD), plating, and chemical mechanical polishing (CMP) methods to form side shield PMR. However, all these proposals do not have a self-aligned structure between the side shield and the trailing shield.

U.S. Pat. No. 7,002,775 to Hsu et al discloses side and trailing shields, but provides no details about how they are made. U.S. Pat. No. 7,253,991 to Fontana, Jr. et al teaches side and trailing shields formed by CMP, but they are not self-aligned. U.S. Pat. No. 7,068,453 to Terris al el and U.S. Patent Application 2007/0253107 to Mochizuli et al teach that side and trailing shields may be a single piece or they may be separate pieces. U.S. Pat. No. 7,070,698 to Le shows side shields and trailing shields formed separately. Co-pending U.S. Patent Application 2007/0177301 to Han et al, filed on Feb. 2, 2006, discloses a method of forming side shields where the pole tip is aligned to the side shields and then forming an upper shield over the side shields.

U.S. Patent Applications 2007/0186408 to Nix et al and 2006/0044682 to Le et al teach self-aligned wrap-around side and trailing shields. However, the main pole in these inventions is formed by deposition and etching processes.

In co-pending patent application Ser. No. 11/906,717 (HT07-016) filed on Oct. 3, 2007, a method is proposed to make a self-aligned full side shield PMR. FIG. 1 shows the air-bearing surface (ABS) view of this self-aligned full side shield PMR head. Main pole 16 is surrounded by write gap 24. Self-aligned full side shield 26 surrounds the pole. Trailing shield 28 overlies the side shield. However, using two separate processes to fabricate the side shield and the trailing shield creates interface flux choking at the interface between the side and trailing shields. Adjacent track erasure (ATE) problems were observed due to this flux choking.

SUMMARY OF THE INVENTION

It is the primary objective of the present invention to fabricate both side shields and trailing shield of a PMR head in one fabrication process.

In accordance with the objective of the invention, a PMR head comprises a substrate, a magnetic pole formed over the substrate, the pole having a pole tip having a cross-sectional tapered shape wherein the pole tip is surrounded by a write gap layer, an integrated shield comprising side shields on the substrate laterally surrounding the pole tip and a trailing shield overlying the pole tip and integral with the side shields.

Also in accordance with the objective of the invention, there is disclosed a method of fabricating a PMR head. An alumina layer is deposited on a substrate and a trench is formed through the alumina layer to the substrate. A first seed layer is deposited over the alumina layer and within the trench. A magnetic main pole is formed on the seed layer wherein the magnetic main pole comprises a main pole area and a pole tip area. The first seed layer not underlying the magnetic main pole is removed. The alumina layer is removed to create a cavity around the pole tip area of the magnetic main pole. A second seed layer is deposited over the substrate within the cavity. An integrated side shield is formed on the second seed layer and overlying the pole tip area.

DETAILED DESCRIPTION OF THE INVENTION

Figure 1:
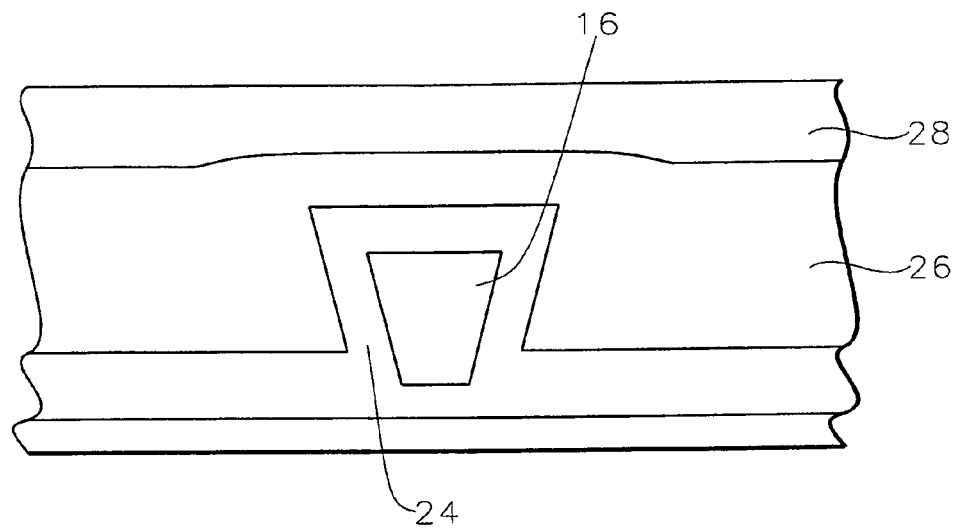
FIG. 1 is a cross-sectional representation of a self-aligned full side shield of co-pending patent application Ser. No. 11/906,717.
Figure 2:
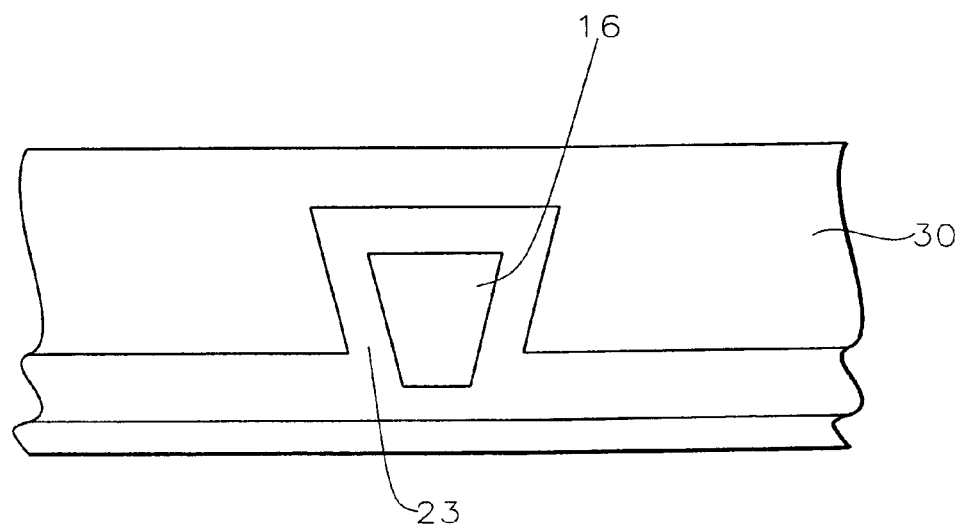
FIG. 2 is a cross-sectional representation of the self-aligned integrated side shields of the present invention.

The present invention provides a method for fabricating self-aligned integrated side and trailing shields for a PMR head. This method fabricates the integrated shields in one process so as to prevent interface flux choking. FIG. 2 shows the completed self-aligned integrated side shield of the invention. Main pole 16 is shown surrounded by write gap 23. Integrated side and trailing shield 30 is fully aligned to the main pole.

Figure 3:
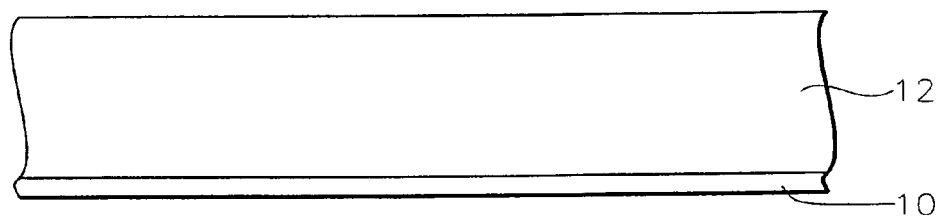
FIGS. 3-8 are cross-sectional representations of the process of the present invention.
Figure 4:
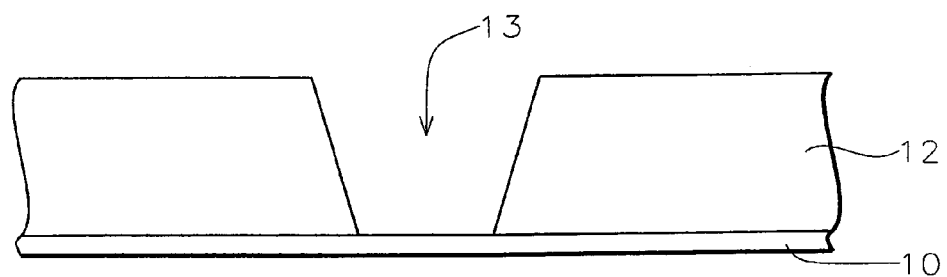
Figure 5:
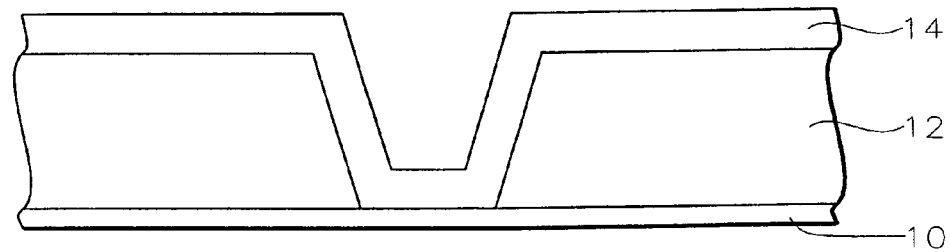

The fabrication process of the present invention will be described with reference to the drawing figures. Referring now to FIG. 3, an ABS view shows the first steps in a process sequence of the present invention. A separation layer 12 made of a dielectric material such as alumina is provided on a substrate 10. Substrate 10 may be an etch stopper material, for example. The alumina layer 12 is formed to a thickness of between approximately 2000 and 4000 Angstroms by a process of physical vapor deposition (PVD), for example. Referring now to FIG. 4, a trench 13 is etched through the alumina layer 12 to the substrate 10. Now, a seed layer 14 is deposited conformally over the alumina layer 12 and into the trench 13 using atomic layer deposition (ALD) to form a uniform side gap, as shown in FIG. 5. The seed layer is preferably Ru, formed to a thickness of between about 300 and 500 Angstroms. The layer 14 also acts as a CMP stopper.

Figure 6:
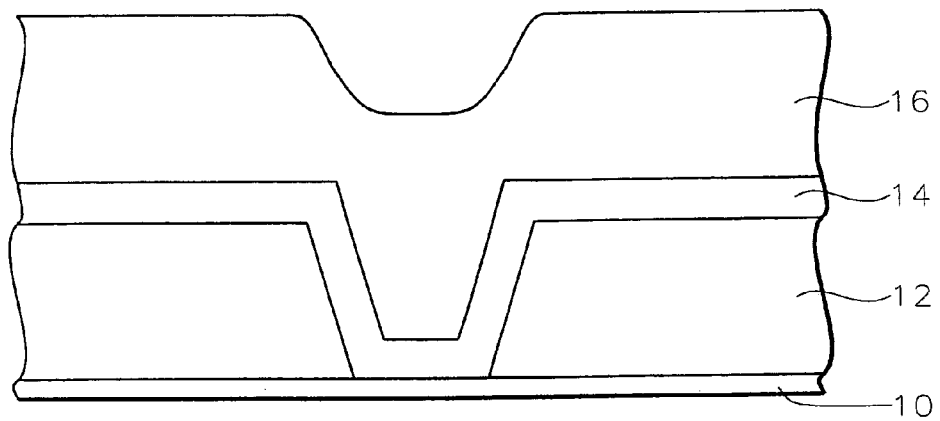

Referring now to FIG. 6, the magnetic main pole 16 is electroplated onto the seed layer 14 in the trench area. The magnetic pole layer is preferably a layer of low coercivity magnetic material such as NiFe, CoNiFe, FeCoNi, or FeNi, for example, and it is plated to a thickness sufficient to fill the trench in a void-free manner, typically about 0.5 to 1 micron in thickness.

Figure 7:
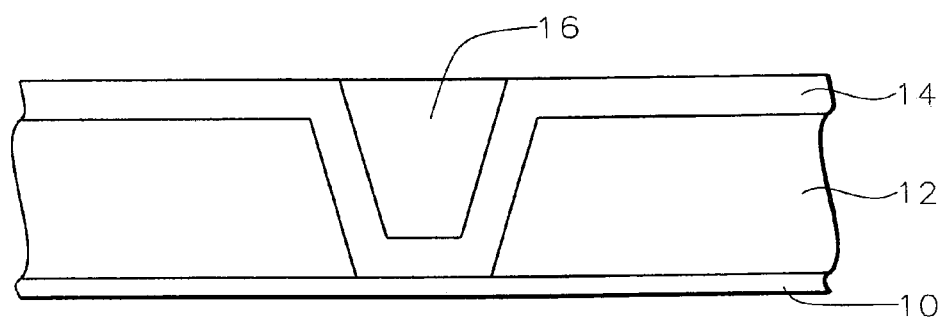
Figure 8:
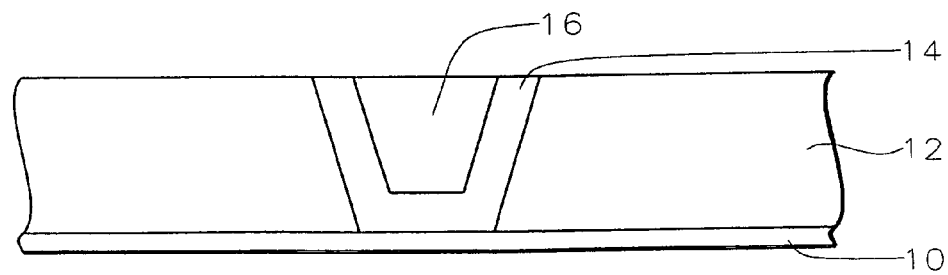
Figure 9A:
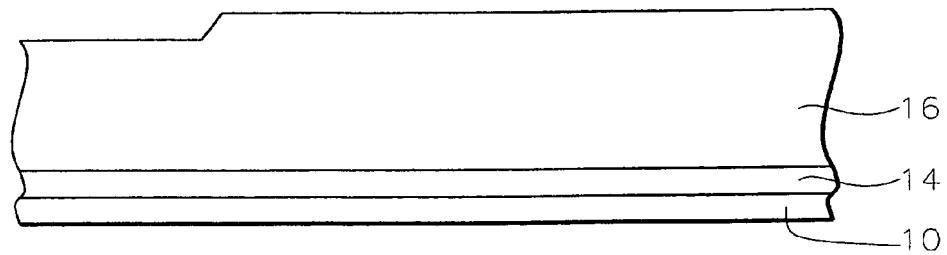
FIG. 9A is a side view and FIG. 9B is a top view of a step in the process of the present invention.
Figure 9B:
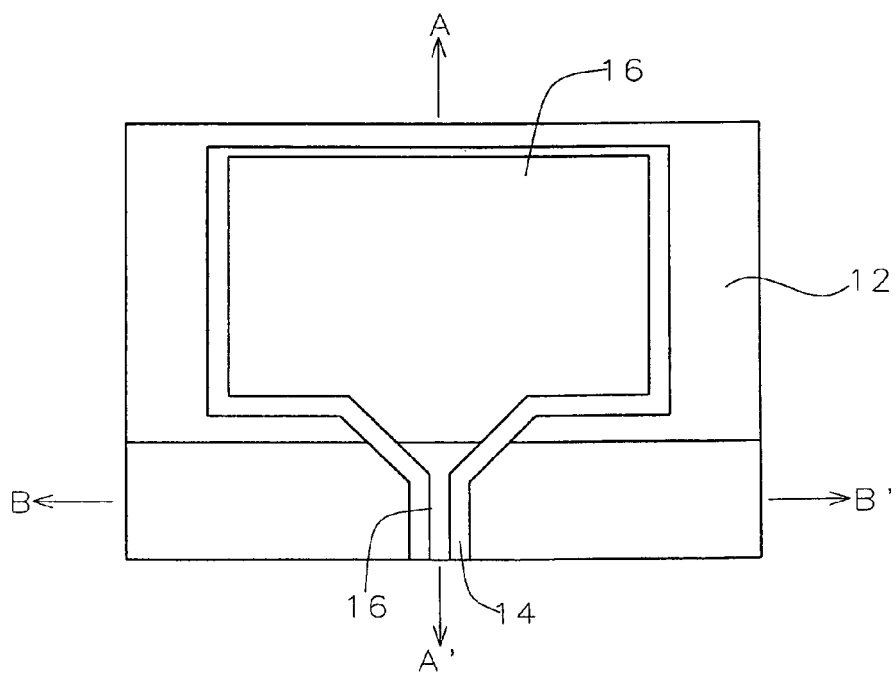

Then, a CMP process is performed to planarize the main pole material 16 to the main pole and Ru interface, as shown in FIG. 7. Next, the Ru layer not underlying the main pole material is removed, for example, using IBE. FIG. 8 shows the ABS view after etching away of the Ru layer. FIG. 9A shows a side view of the center line and FIG. 9B shows a top view of the main pole piece at this step in the fabrication process. FIG. 8 shows the view B-B' of the top view in FIG. 9B. FIG. 9A shows the view A-A' of the top view in FIG. 9B.

Figure 10A:
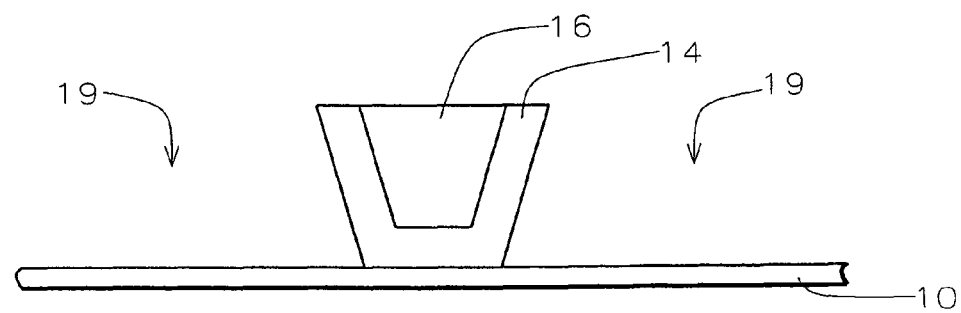
FIG. 10A is a cross-sectional view and FIG. 10B is a top view of a step in the process of the present invention.
Figure 10B:
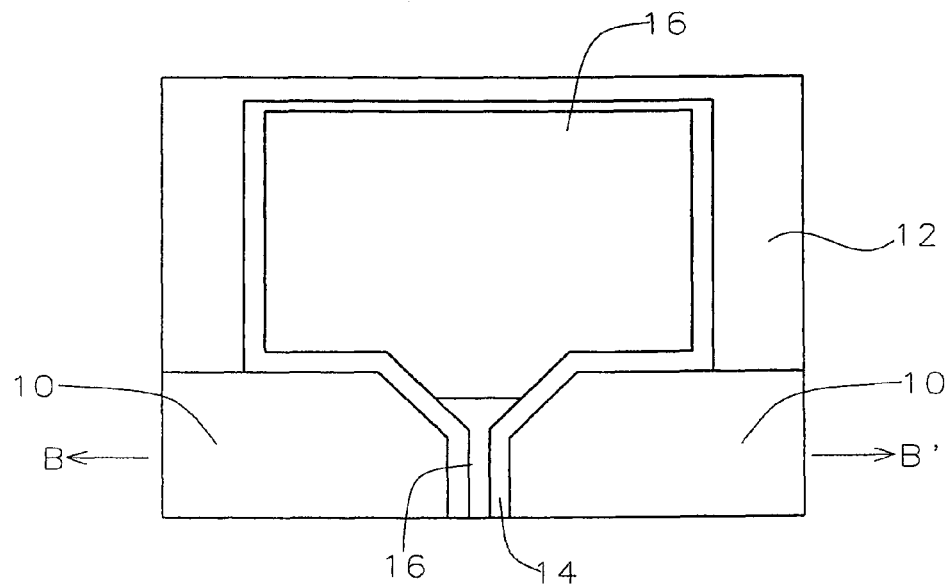

FIG. 10A shows the ABS view and FIG. 10B shows the top view of the next step in the process, where the view B-B' of FIG. 10B is shown in FIG. 10A. A photoresist mask, not shown, is formed over the alumina layer 12 and the main pole region. The alumina 12 is removed using, for example, IBE followed by an alkaline solution treatment, where it is not covered by the mask, not shown, to create a cavity 19 around the selected main pole tip area, as shown in FIGS. 10A and 10B.

Figure 11A:
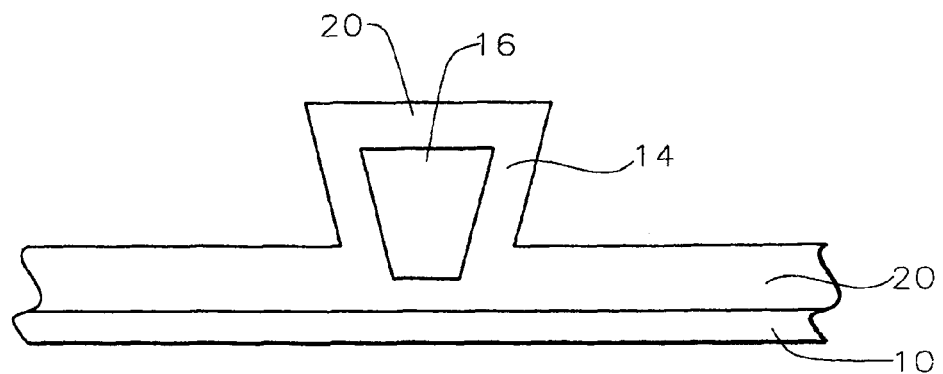
FIG. 11A is a cross-sectional view and FIG. 11B is a side view of a step in the process of the present invention.
Figure 11B:
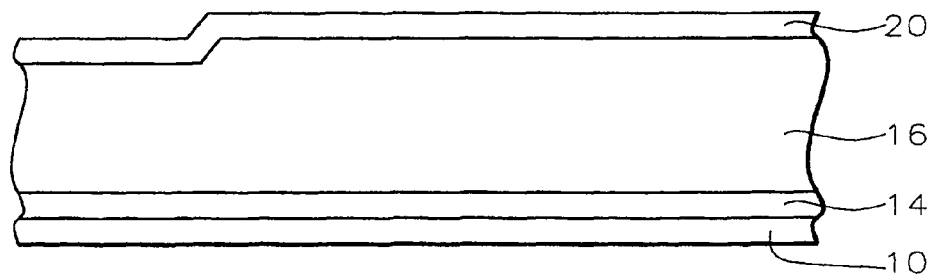

Next, as shown in the ABS view in FIG. 11A and in side view in FIG. 11B, a second Ru layer 20 is deposited, preferably by ALD, over the substrate 10 in the cavity areas around the main pole and over the main pole 16, as shown. The sidewall areas of the main pole, as shown in FIG. 11A, comprise the first Ru layer 14 and the second Ru layer 20 thereover. The first and second Ru layers 14 and 20 together act as a partial side shield gap and write gap. The total write gap layer has a preferred thickness of between about 300 and 500 Angstroms.

Figure 12:
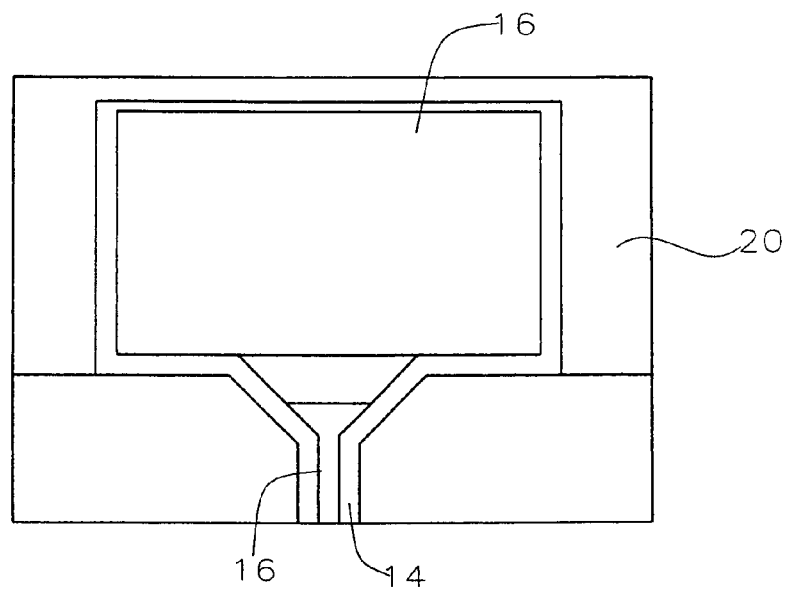
FIGS. 12 and 13 are top views of steps in the process of the present invention.
Figure 13:
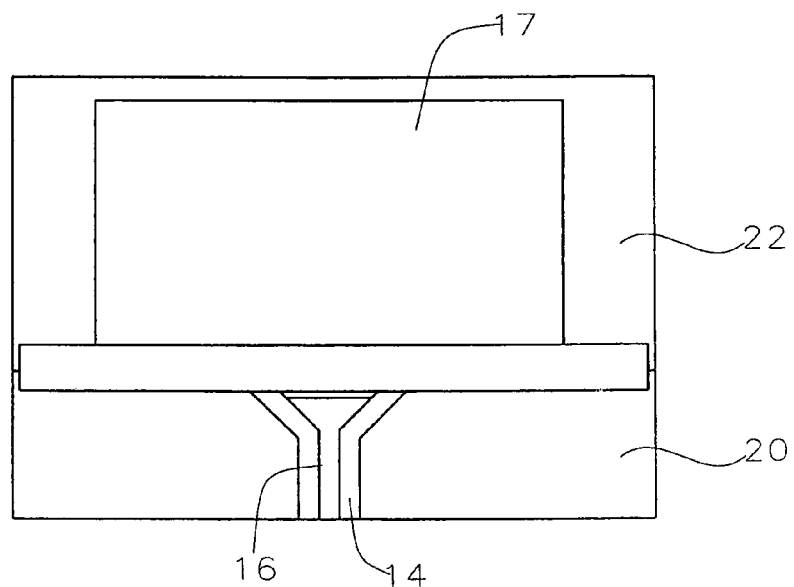

Referring now to FIG. 12, a via opening for the top yoke is made through the Ru layer 20 to expose the main pole 16. This is preferably performed by IBE, and followed by a magnetic seed layer deposition 17 such as CoNiFe or NiFe, as shown in FIG. 13. Now, a writer shield photo pattern is made using a negative resist process. Mask 22 is shown in top view in FIG. 13.

Figure 14A:
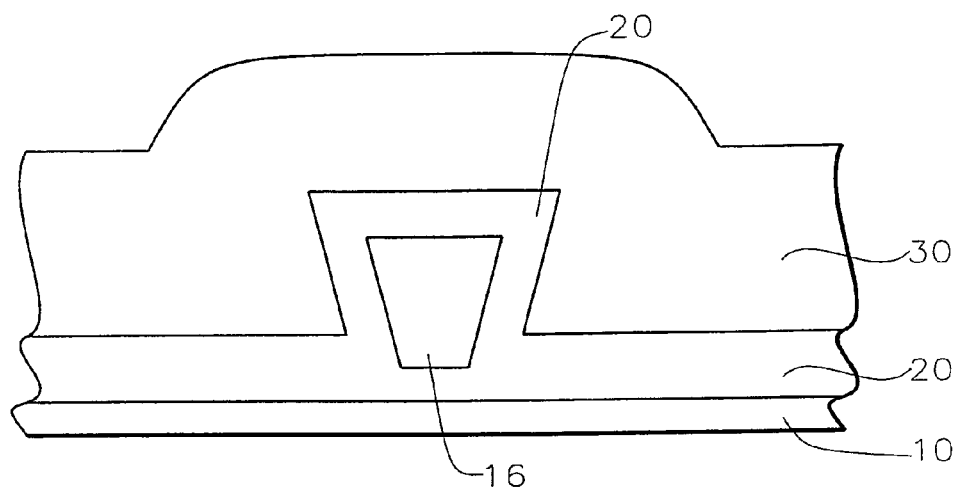
FIG. 14A is a cross-sectional view and FIG. 14B is a top view of a step in the process of the present invention.
Figure 14B:
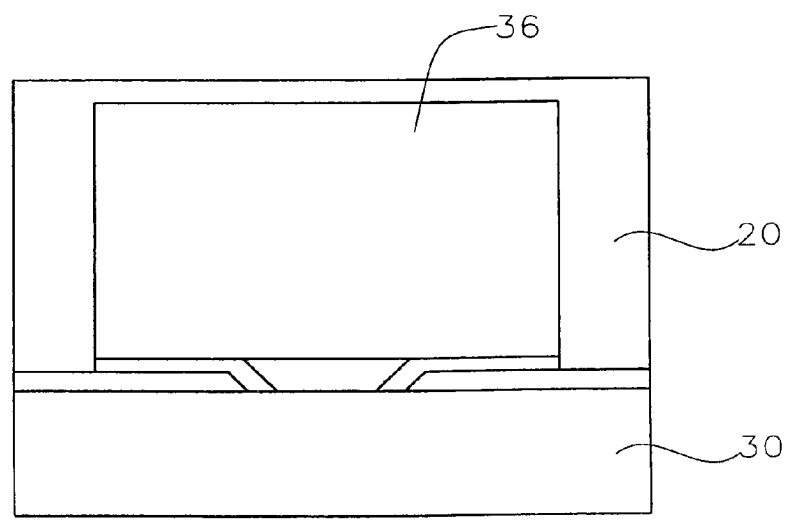

FIG. 14A shows the ABS view and FIG. 14B shows the top view of the next step in the fabrication process. Shield material 30 is plated on the Ru layer 20. The Ru layer 20 acts as a seed layer for the purpose of the plating process. The shield material is a layer of magnetic material such as FeNi, CoNiFe, FeCoNi, or NiFe and it is plated to a thickness of approximately 2 microns. This plating process also forms the top yoke 36, shown in FIG. 14B.

Figure 15:
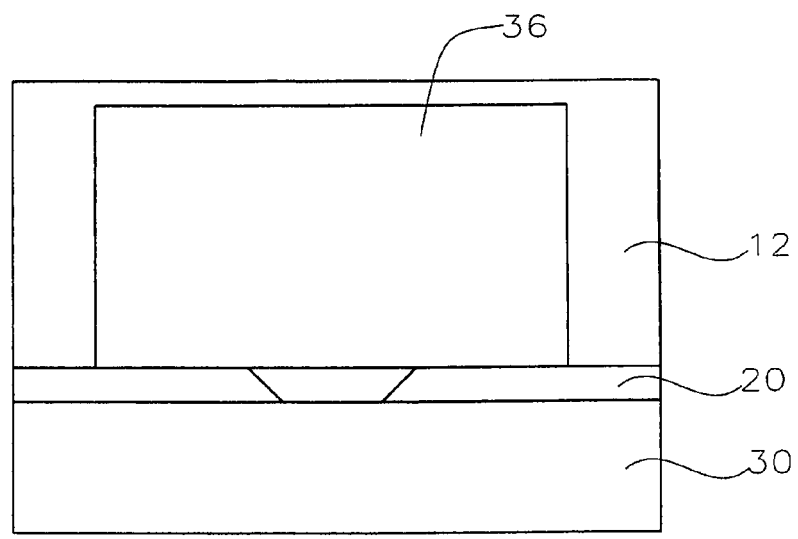
FIG. 15 is a top view of a step in the process of the present invention.

The plating seed layer 20 not covered by the shield material 30 is removed by IBE, as shown in top view in FIG. 15.

Figure 16A:
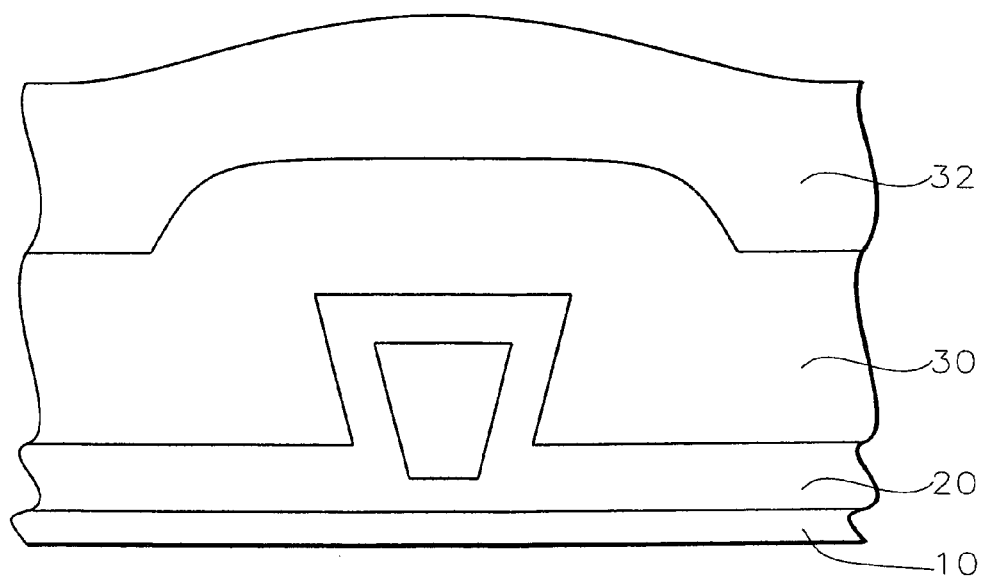
FIG. 16A is a cross-sectional view and FIG. 16B is a top view of a step in the process of the present invention.
Figure 16B:
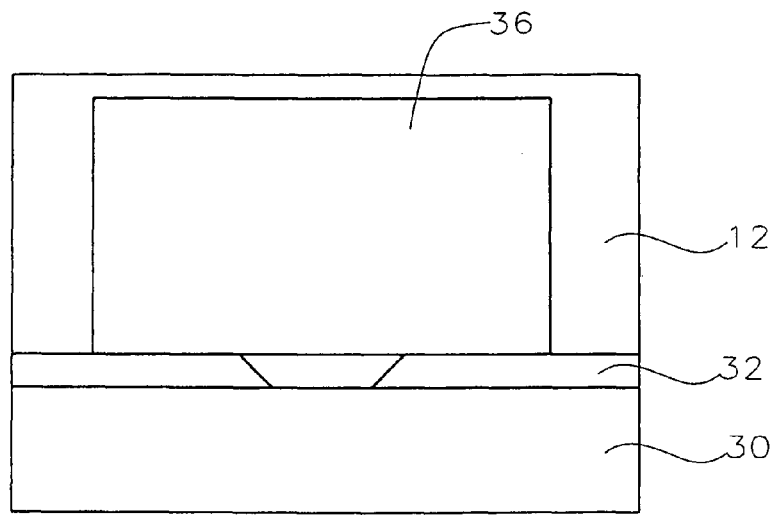

Referring now to FIGS. 16A and 16B, the structure is covered with alumina 32 deposited by a high rate ALD or PVD process.

Figure 17A:
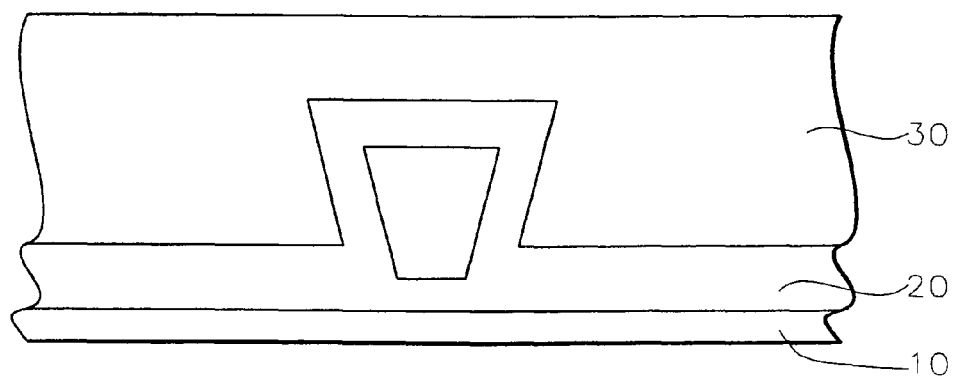
FIG. 17A is a cross-sectional view and FIG. 17B is a side view of a step in the process of the present invention.
Figure 17B:
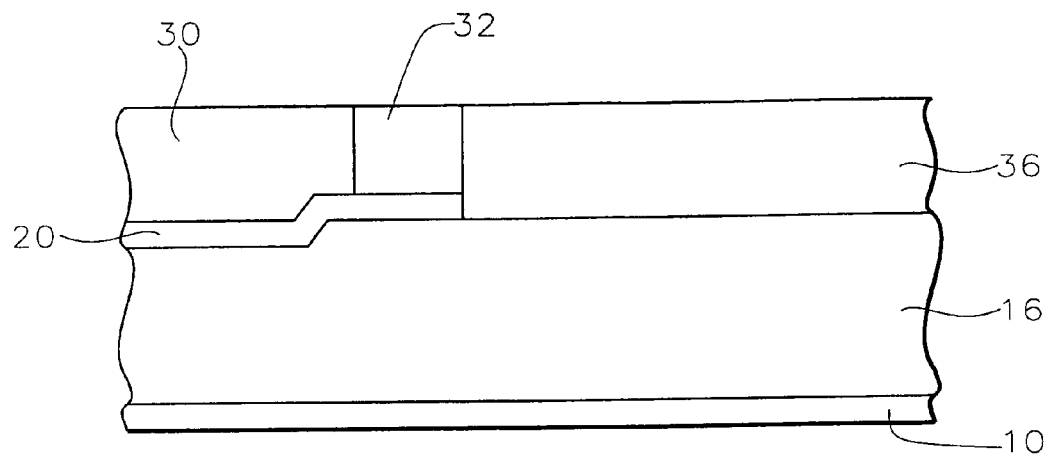

Now, a CMP process is performed to form the trailing portion of the integrated shield to the target thickness of about 0.6 micron, as shown in the ABS view in FIG. 17A and in side view in FIG. 17B.

Figure 18:
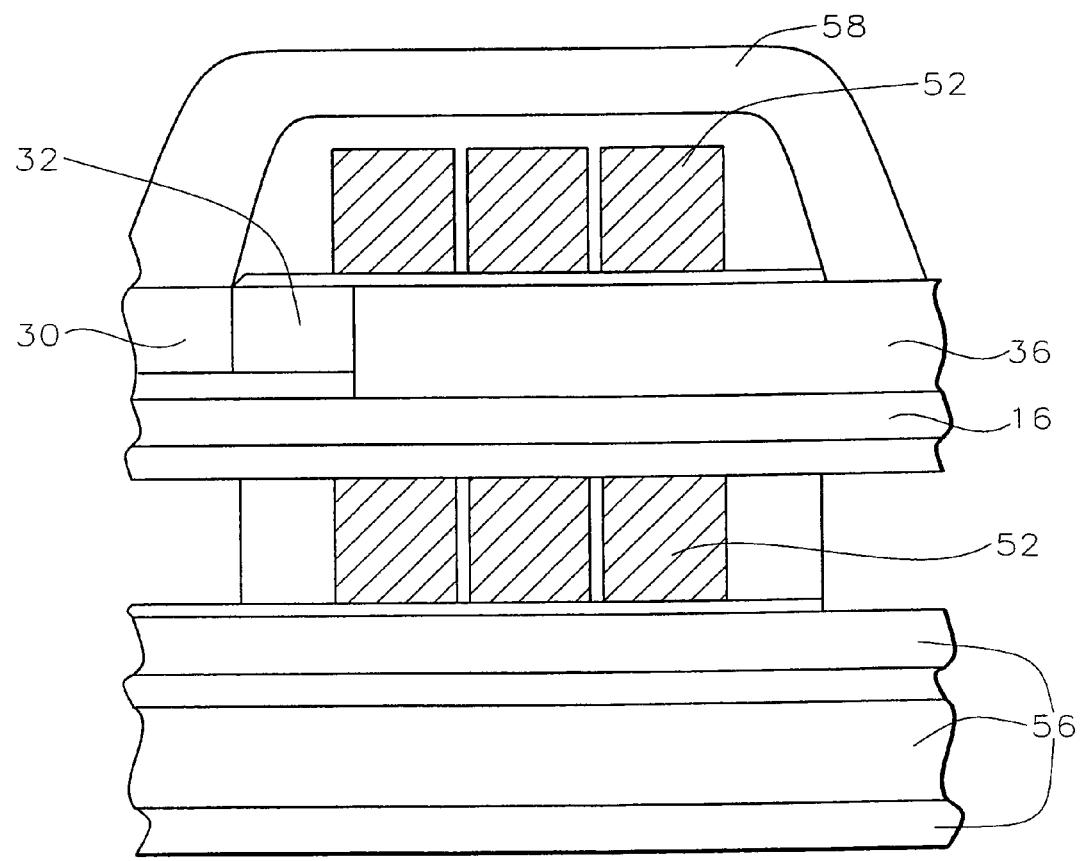
FIG. 18 is a side view of the completed PMR head of the present invention.

Finally, the PMR writer is completed, as known in the art. For example, side view FIG. 18 shows spirally wound electrically conducting coils formed about the magnetic pole 16. Insulator 54, read shields 56, and write shield 58 are also shown.

The present invention provides an integrated side shield PMR head structure, as illustrated in FIG. 2. There is no interface between the side shield and the trailing shield since it is formed in one process step. The integrated side shield 30 surrounds and overlies the main pole tip 16. Write gap layer 23 comprises first and second Ru layers 14 and 20, respectively. The magnetic main pole has a preferred width of between about 50 and 500 nm.

The integrated side shield PMR head structure of the present invention comprises a tapered main pole or tapered write gap with side shield design to reduce side fringe for further enhancement of tracks per inch (TPI), a better track profile, and elimination of adjacent track erasure (ATE) caused by flux choking at the side shield and trailing shield interface.

Although the preferred embodiment of the present invention has been illustrated, and that form has been described in detail, it will be readily understood by those skilled in the art that various modifications may be made therein without departing from the spirit of the invention or from the scope of the appended claims.

What is claimed is:

1. A perpendicular magnetic recording (PMR) head comprising:
   a substrate;
   a magnetic pole formed over said substrate, said magnetic pole having a pole tip having a cross-sectional tapered shape, said pole tip surrounded by a Ru write gap layer; and
   an integrated shield comprising side shields on said substrate laterally surrounding said pole tip and a trailing shield overlying said pole tip and integral with said side shields.

2. The PMR head according to claim 1 further comprising spirally wound electrically conducting coils formed about said magnetic pole and capable of producing a magnetic field directed substantially perpendicularly to an ABS plane from said pole tip when said coils are electrically energized.

3. The PMR head according to claim 1 wherein said integrated shield is formed of NiFe to a thickness between approximately 3000 and 4000 Angstroms.

4. The PMR head according to claim 1 wherein said magnetic pole is formed of FeNi, CoNiFe, FeCo, or NiFe to a thickness of approximately 2 microns.

5. The PMR head according to claim 1 wherein said write gap layer has a thickness between approximately 300 and 500 Angstroms.

6. The PMR head according to claim 1 wherein said magnetic pole has a width between approximately 50 and 500 nm.

* * * * *